(12) United States Patent
Fukushima

(10) Patent No.: US 6,362,120 B1
(45) Date of Patent: Mar. 26, 2002

(54) ALUMINA CERAMIC COMPOSITION

(75) Inventor: Hideko Fukushima, Saitama-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 09/605,431

(22) Filed: Jun. 29, 2000

(30) Foreign Application Priority Data

Jun. 29, 1999 (JP) .......................................... 11-183429

(51) Int. Cl.[7] .............................................. H01B 3/12
(52) U.S. Cl. ...................................... 501/127; 501/153
(58) Field of Search ................................... 501/127, 153

(56) References Cited

U.S. PATENT DOCUMENTS

| | | | |
|---|---|---|---|
| 4,591,574 A | 5/1986 | Ando et al. ................. | 501/136 |
| 4,614,725 A | 9/1986 | Ando et al. ................. | 501/136 |
| 5,076,815 A | * 12/1991 | Kunz et al. ................. | 501/153 |
| 5,652,189 A | 7/1997 | Trabelsi ...................... | 501/153 |

FOREIGN PATENT DOCUMENTS

| | | |
|---|---|---|
| JP | 04356922 A | 10/1995 |
| JP | 08059338 A | 5/1996 |
| WO | WO 97/23429 | 7/1997 |

OTHER PUBLICATIONS

Hwang, Chii–Shyang et al., "Microstructure and Mechanical Strength of TiO$_2$–Doped and Al$_2$O$_3$ Ceramics Fired in Vacuum Atmosphere", Journal of the Ceramic Society of Japan, Int. Edition, vol. 101, 1993, pp. 1051–1056, (XP000983068).

Holcombe, Jr. et al. [1], "Calculated X–Ray powder diffractio data for beta Al2TiO5", J. Am. Ceram. Soc., vol. 56, No. 4, 1973, pp. 220–221, (XP002162889).

Huang et al., Adv. X–Ray Anal., vol. 33, 1990, p. 295 (XP002162890) (is JCPDS file 46–1212).

Watanabe et al., "Resistivity and microstructure of alumina ceramics added with TiO2 fired in reducing atmospheres", J. Ceram. Soc. Japan, vol. 101, 1993, pp. 1107–1114, (XP000983069).

McKee et al., "Aluminum Oxide–Titanium Oxide solid solution", J. Am. Ceram. Soc., vol. 46, No. 1, 1963, pp. 54–58, (XP002162638).

Swiatnicki et al., "Grain boundary structure and intergranular segregation in Al203", Acta Metall. Mater., vol. 43, No. 2, 1995, pp. 795–805, (XP000981599).

* cited by examiner

Primary Examiner—C. Melissa Koslow
(74) Attorney, Agent, or Firm—Sughrue Mion, PLLC

(57) ABSTRACT

An alumina ceramic composition comprising 10 weight % or less (calculated as MgO) of Mg, and 0.2–10 weight % or more (calculated as TiO$_2$) of Ti, the balance being substantially an Al$_2$O$_3$ phase and inevitable impurities. An Al$_2$TiO$_5$ phase is precipitated in grain boundaries. The Al$_2$TiO$_5$ phase surrounds inevitable impurities in the grain boundaries. The alumina ceramic composition exhibits a Q factor of 850 or more when measured at a frequency of 10 GHz.

15 Claims, 6 Drawing Sheets

1 Al$_2$O$_3$ phase
4 Grain boundary
2 Grain boundary phase Al$_2$TiO$_5$
3 Impurities such as ZrO$_2$, etc. encircled by grain boundary phase 6μm

ALUMINA CERAMIC COMPOSITION

FIELD OF THE INVENTION

The present invention relates to an alumina ceramic composition, more particularly to an alumina ceramic composition exhibiting a high Q factor in a high frequency band such as a radio frequency band, a microwave band, etc.

DESCRIPTION OF PRIOR ART

For circuit substrates used in a high-frequency band and parts for microwave transmission apparatuses, alumina ceramic compositions having small dielectric loss are required to reduce transmission loss. Though so-called high-purity alumina having a purity of about 99.999% is a material having a small dielectric loss, it cannot advantageously be used for alumina ceramic compositions for parts of the above microwave transmission apparatuses, etc., because its sintering temperature is disadvantageously as high as 1600° C. For instance, when the sintering temperature exceeds 1500° C., higher-quality sintering furnaces are needed, resulting in decrease in productivity and higher production cost. Also, the high-purity alumina per se is so expensive that it cannot be used for parts of microwave transmission apparatuses, etc., which are required to be small and inexpensive with high performance.

Thus widely used as inexpensive alumina materials having a purity of about 99.8% for parts of microwave transmission apparatuses, etc. are alumina ceramic compositions with improved sinterability by lowering a sintering temperature to 1400 1500° C. with small amounts of MgO or $TiO_2$. Though the addition of MgO, etc. is effective to lower the sintering temperature, it tends to increase the dielectric constant of the resultant alumina ceramic compositions. As a result, such alumina ceramic compositions as containing MgO or $TiO_2$ fail to have sufficient Q factors for practical applications due to extremely increased dielectric loss as compared with high-purity alumina.

Disclosed as an alumina ceramic composition with lowered dielectric loss and increased Q factor in Japanese Patent Laid-Open No. 4-356922 is an alumina ceramic composition having a dielectric loss (tan δ) of $1\times10^{-4}$ to $1\times10-3$ and a Q factor of 1,000 to 10,000 by limiting the total content of alkali metals (as $Na_2O$, $K_2O$) to 150 ppm or less. Further, an alumina ceramic composition disclosed in Japanese Patent Laid-Open No. 8-59338 has a Q factor of 10,000 or more by limiting the total content of alkali metals (calculated as $Na_2O$, $K_2O$) to 100 ppm or less and the content of Mg (calculated as MgO) to a particular range of 100 ppm or less or 1,000 to 50,000 ppm. Japanese Patent Laid-Open No. 8-59338 suggests that inevitable impurities such as Si, Fe, Ca, Ti, etc. are contained in the alumina ceramic composition, and that the amount of each impurity is 500 ppm or less.

However, both of Japanese Patent Laid-Open Nos. 4-356922 and 8-59338 are directed to alumina ceramic compositions with relatively high Q factors, in which the total content of alkali metals (as $Na_2O$, $K_2O$) are necessary to be limited to extremely small amounts such as 100–150 ppm or lower. For this purpose, expensive high-purity alumina is used as a starting material, or when a common-grade alumina is used as a starting material, an additional step of fully removing alkali metals is needed, resulting in higher production cost.

It has conventionally been considered that in alumina ceramic compositions, the amounts of impurities dissolved in grain boundaries and alumina crystal grains contribute to increase in their dielectric loss. Generally adopted to obtain alumina ceramic compositions with low dielectric loss is to use as a starting material high-purity alumina, in which the total content of impurities such as alkali metals ($Na_2O$, $K_2O$) are limited. As described above, however, this may deteriorate the productivity and sinterability of alumina ceramic compositions. Thus, there has conventionally not been proposed an alumina ceramic composition formed from a usual low-purity alumina starting material and having low loss (high Q factor) and low-temperature sinterability.

OBJECT OF THE INVENTION

Accordingly, an object of the present invention is to provide an alumina ceramic composition having a low dielectric loss (high Q factor) and improved sinterability and productivity, which is formed from a usual low-purity alumina starting material without using high-purity alumina.

SUMMARY OF THE INVENTION

As a result of research on the influence of various impurities and additives on the dielectric loss of an alumina ceramic composition, the inventor has found that when the amount of Mg added to improve the sinterability of alumina is within a particular range, the resultant alumina ceramic composition has an extremely decreased Q factor. Specifically, when the content of Mg is 0.2 weight % or less when calculated as MgO, the Q factor of the alumina ceramic composition is small, and when the Mg content is near 0.05 weight %, the Q factor of the alumina ceramic composition is extremely small. On the other hand, the addition of Ti in an amount of 0.2–10 weight % (calculated as $TiO_2$) improves the Q factor of an alumina ceramic composition, which would be extremely low if otherwise, even with the Ti content of 0.2 weight % or less, for instance, 0.05 weight % (calculated as $TiO_2$). In sum, while the dielectric loss of an alumina ceramic composition is suppressed to provide an improved Q factor by limiting the contents of alkali metals and MgO to particular ranges in the above prior art, the present invention has achieved to provide an alumina ceramic composition formed from a low-purity alumina starting material with an improved Q factor by adding both Mg and Ti in particular amounts.

Thus, the first alumina ceramic composition according to the present invention comprises 10 weight % or less (calculated as MgO) of Mg, and 0.2–10 weight % (calculated as $TiO_2$) of Ti, the balance being substantially an $Al_2O_3$ phase and inevitable impurities.

In the first alumina ceramic composition, the content of Mg is preferably 0.2 weight % or less, more preferably about 0.05 weight %, when calculated as MgO. Also, the content of Ti added together with Mg is preferably 0.5–10 weight %, more preferably 0.75–5 weight %, when calculated as $TiO_2$. The proportion of Mg to Ti is properly balanced within the above ranges. It is preferable that the structure of the alumina ceramic composition partially contains an $Al_2TiO_5$ phase.

The second alumina ceramic composition according to the present invention has a structure based on an $Al_2O_3$ main phase and partially containing an $Al_2TiO_5$ phase, a ratio X of [I(AT)/I(Al)×100%] being 0.2–15%, wherein I (Al) represents a diffraction intensity in a (113) plane in the $Al_2O_3$ phase, and I (AT) represents a diffraction intensity in a (110) plane in the $Al_2TiO_5$ phase, both determined from an X-ray diffraction pattern.

In the first and second alumina ceramic compositions, the $Al_2TiO_5$ phase is preferably precipitated in grain boundaries.

The Al$_2$TiO$_5$ phase precipitated in grain boundaries preferably surrounds part of grain boundaries composed of inevitable impurities.

The third alumina ceramic composition according to the present invention is based on Al$_2$O$_3$ and containing Mg, Ti and inevitable impurities, wherein the value $\Delta L_a$ obtained by subtracting the standard value $L_s$ of an a-axis lattice constant of Al$_2$O$_3$ in the standard data list of powder X-ray diffraction patterns (JCPDS card No. 46-1212) from an a-axis lattice constant $L_a$ of the Al$_2$O$_3$ phase in the alumina ceramic composition is in the range of $-0.003 \leq \Delta L_a < 0$ (unit: angstrom).

The first to third alumina ceramic compositions preferably have a Q factor of 850 or more, particularly 1000 or more, when measured at a frequency of 10 GHz. The upper limit of the Q factor is preferably about 3800. An available range of the Q factor is thus about 850 to about 3800.

DESCRIPTION OF THE PREFERRED EMBODIMENTS

Figure 1:
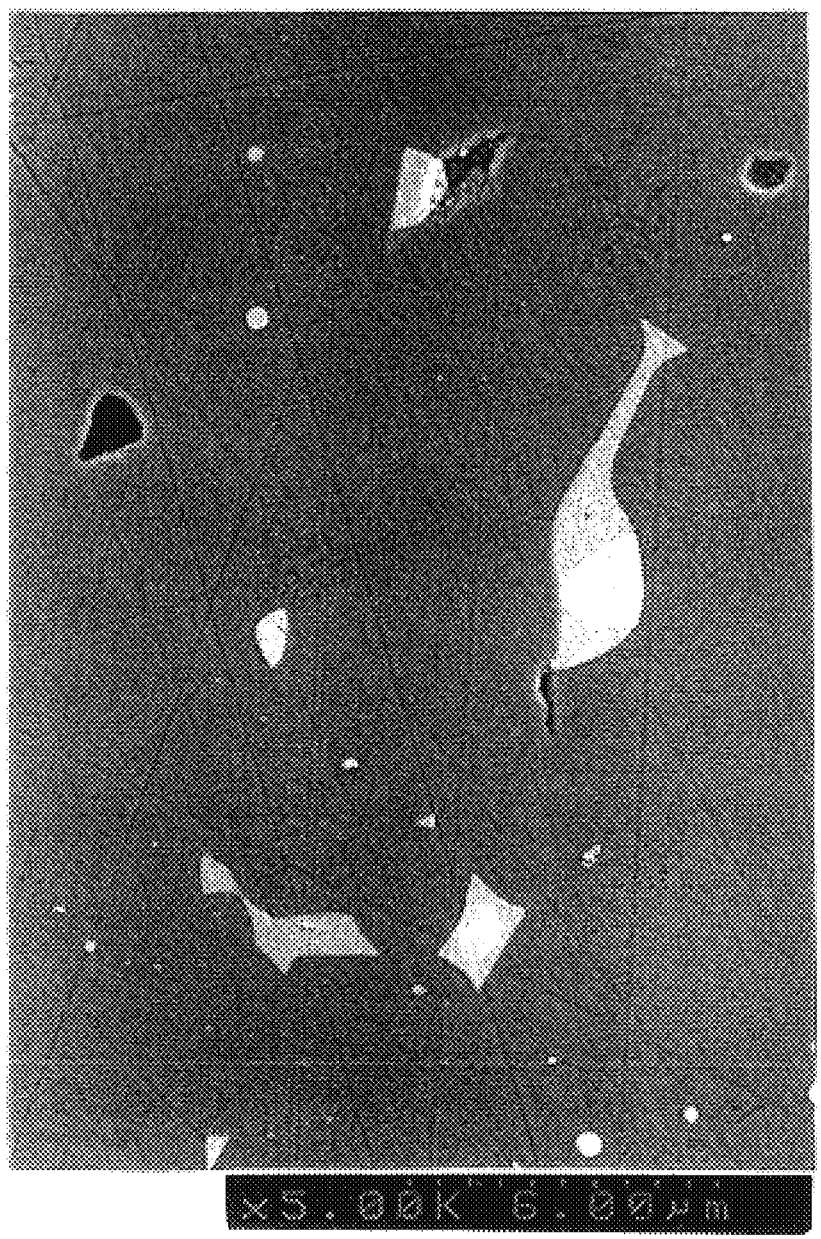
FIG. 1 is a photomicrograph showing the structure of an alumina ceramic composition of Sample No. 10 (EXAMPLE 7)

[1] Composition
(A) Mg

Mg is effective to improve the sinterability of low-purity alumina by suppressing its sintering temperature. When the content of Mg exceeds 10 weight % (calculated as MgO), however, further improvement in sinterability cannot be obtained, only resulting in decrease in a Q factor to less than 850. Thus, the content of Mg should be 10 weight % or less. The content of Mg is preferably 8 weight % or less, more preferably 5 weight % or less, most preferably 1 weight % or less, particularly about 0.05 weight %. The lower limit of the Mg content is generally 0.01 weight %, preferably 0.02 weight %, more preferably 0.05 weight %.
(B) Ti Because the dielectric loss increases and thus the Q factor drastically decreases when the Mg content becomes 0.2–0.01 weight %, Ti is effectively added to improve the Q factor. When the content of Ti is less than 0.2 weight % (calculated as TiO$_2$), improvement in the sinterability of the alumina ceramic composition cannot be expected. As the content of Ti increases to 0.5 weight % or further, the Q factor is improved rapidly. Though further addition of Ti keeps the improved Q factor, more than 10 weight % of Ti rather decreases the Q factor. Thus, the content of Ti is 0.2–10 weight % (calculated as TiO$_2$), preferably 0.5–10 weight % and more preferably 0.75–5 weight %.

With both Mg and Ti added to alumina in the above ranges, the resultant alumina ceramic composition is provided with a high Q factor and improved sinterability. Though the mechanism of improving a Q factor and sinterability by adding both Mg and Ti is not necessarily clear, it may be presumed that MgO and TiO$_2$ function to improve the sinterability of an alumina ceramic composition, while prompting the formation of Al$_2$TiO$_5$ in grain boundaries such that it surrounds impurities in the grain boundaries, thereby suppressing impurities from dissolving into the alumina crystal grains, resulting in improvement in the Q factor of the alumina ceramic composition.
(C) Impurities Though the amounts of impurities are preferably as small as possible in the alumina ceramic composition of the present invention, the inclusion of inevitable impurities such as alkali metals such as Na and K, Zr, Y, Fe, Si, Ca, Ga, Cr, etc. cannot be avoided in the production thereof. Particularly, alkali metals such as Na and K are contained in the alumina ceramic composition in a total amount of 0.02–0.2 weight %, preferably 0.02–0.1 weight %, more preferably 0.04–0.1 weight %, based on alumina.

With respect to other impurities, their permissible amounts (calculated as oxides) are approximately as follows: Zr; 2 weight % or less, Y; 0.2 weight % or less, Fe; 0.05 weight % or less, Si; 0.02 weight % or less, Ca; 0.02 weight % or less, Ga; 0.01 weight % or less, and Cr; 0.005 weight % or less. Within the above ranges of inevitable impurities, the Q factor of the alumina ceramic composition is scarcely affected.
[2] Structure The alumina ceramic composition of the present invention has a structure having a main phase composed of Al$_2$O$_3$ crystal grains and grain boundaries containing Al$_2$TiO$_5$. An Al$_2$TiO$_5$ phase precipitated in the grain boundaries functions to surround or wrap inevitable impurities such as ZrO$_2$, etc., thereby preventing these inevitable impurities from dissolving into alumina crystal grains. Thus, in a preferred embodiment, the grain boundaries are substantially constituted by Al$_2$TiO$_5$ crystals.

If inevitable impurities dissolved into alumina crystal grains, the dielectric loss of the alumina ceramic composition would increase, resulting in decrease in a Q factor. However, because the inevitable impurities are prevented from dissolving into alumina crystal grains by the existence of Al$_2$TiO$_5$, the dielectric loss of the alumina ceramic composition does not increase, and the growth of Al$_2$O$_3$ crystal grains is accelerated to reduce pores, resulting in a dense alumina sintered body. The decrease in pores is preferable in improvement in dielectric constant. Thus, the formation of an Al$_2$TiO$_5$ phase in the grain boundaries accelerates improvement in the Q factor and sinterability.

The structure of the alumina ceramic composition according to another embodiment of the present invention is characterized in that a ratio X of [I (AT)/I(Al)×100%] is 0.2–15%, wherein I (AT) represents a diffraction intensity in a (110) plane in the Al$_2$TiO$_5$ phase, and I (Al) represents a diffraction intensity in a (113) plane in the Al$_2$O$_3$ phase, both determined from an X-ray diffraction pattern. The diffraction intensity ratio X corresponds to the proportion of the $Al_2TiO_5$ phase to the $Al_2O_3$ crystal grains. When X is less than 0.2, the alumina ceramic composition is poor in sinterability, failing to achieve improvement in the Q factor. On the other hand, when X is more than 15, the Q factor tends to deteriorate. Thus, the ratio X should be 0.2–15. The preferred ratio X is 0.2–10.

According to a further embodiment of the present invention, the value $\Delta L_a$ obtained by subtracting the standard value $L_s$ of an a-axis lattice constant of $Al_2O_3$ in a standard powder X-ray diffraction pattern data list (JCPDS card No. 46-1212) from an a-axis lattice constant $L_a$ of the $Al_2O_3$ phase is in the range of $-0.003 \leq \Delta L_a < 0$ (unit: angstrom). This parameter $\Delta L_a$ is related to the crystal structure and strain of the alumina ceramic composition, because part of Mg and impurities, once dissolved in the $Al_2O_3$ crystal grains, distort the crystal structure, resulting in change in lattice constant ad thus deterioration in the Q factor. When $\Delta L_a$ is less than $-0.003$ or equal to or more than 0, the alumina ceramic composition cannot be provided with a Q factor of 850 or more.

[3] Production

To produce the alumina ceramic composition of the present invention, low-purity alumina powder, 10 weight % or less of magnesium oxide (calculated as MgO), and 0.2–10 weight % of titanium oxide (calculated as $TiO_2$) may be formulated and ball-milled with yttria-stabilized zirconia balls and pure water. The resultant slurry is dried by a spray drier, crushed and then granulated. The resultant granular powder is molded by a die press and sintered at 1400–1600° C. for 0.5–4 hours in the air. After ball-milling, calcination may be carried out.

In the production of the alumina ceramic composition of the present invention, high-purity alumina needs not be used as a starting material, and low-purity alumina having a purity of 99.8% or less is used. The low-purity alumina contains generally 0.02–0.2 weight %, particularly 0.02–0.1 weight %, more particularly 0.04–0.1 weight % (calculated as oxides), in total, of alkali metals such as Na, K, etc. Other impurities may be Zr, Y, Fe; Si, Ca, Ga Cr, etc. With such low-purity alumina, it is possible to produce an alumina ceramic composition with a Q factor of 850 or more at 10 GHz at a lower sintering temperature that enables it to use common sintering furnace, thereby improving productivity.

Each of magnesium oxide and titanium oxide may have a purity of 0.1 % or less, and their impurities are, for instance, alkali metals, Zr, Y, Fe; Si, Ca, Ga Cr, etc. The alumina ceramic composition may also be contaminated with Zr, Y, etc. during the ball-milling process using $Y_2O_3$-stabilized $ZrO_2$ balls.

The present invention will be described in detail referring to EXAMPLES below without intention of limiting the present invention thereto.

EXAMPLES 1–23

Comparative Examples 1–12

Widely used low-purity alumina (purity: 99.5%, average particle size: 0.3 μm), MgO powder (average particle size: 0.1 μm), and $TiO_2$ powder (average particle size: 0.3 μm) were weighed to provide compositions shown in Table 1 below, and each of the resultant mixtures was charged into a plastic pot together with $Y_2O_3$-stabilized $ZrO_2$ balls and pure water to carry out ball milling for 20 hours. Each of the resultant slurries was mixed with 1 weight % of polyvinyl alcohol and stirred. The resultant mixture slurry was dried at 90° C. by a spray drier in the air for granulation. The resultant granular powder was molded to 15 mm in diameter×7.5 mm in thickness by a die press. The resultant green body was sintered at a temperature in the range of 1400–1600° C. as shown in Table 1 for 2 hours, and the resultant sintered body was ground to provide a test piece of 10 mm in diameter×5 mm in thickness.

Composition analysis revealed that the above low-purity alumina contained as impurities 0.05 weight % of Na (calculated as $Na_2O$), 0.6 weight % of Zr (calculated as $ZrO_2$), 0.2 weight % of Y (calculated as $Y_2O_3$), 0.15 weight % of Fe (calculated as $Fe_2O_3$), 0.01 weight % of Si (calculated as $SiO_2$), 0.01 weight % of Ca (calculated as CaO), 0.0025 weight % of Ga (calculated as $Ga_2O_3$), and 0.001 weight % of Cr ($Cr_2O_3$).

With respect to each test piece, a Q factor was measured by a Hakki & Coleman method. Further, measurement was conducted on each test piece with respect to a dielectric constant $\epsilon_r$ and a density of a sintered body. The results are shown in Table 1.

Figure 5:
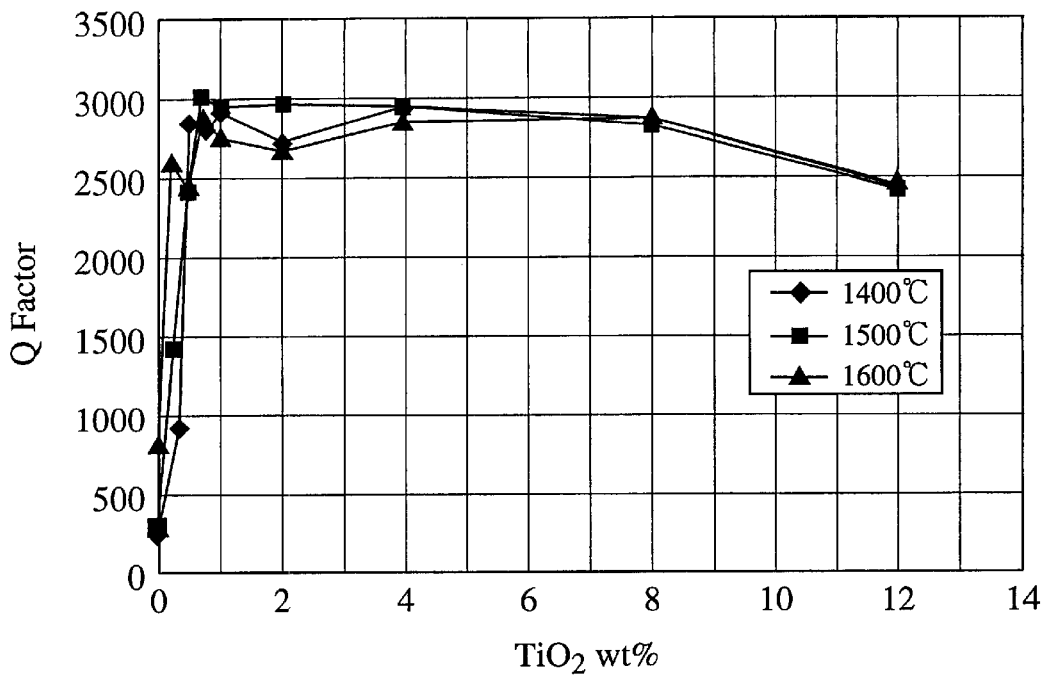
FIG. 5 is a graph showing the relation between the content of TiO$_2$ and a Q factor in alumina ceramic compositions containing 0.05 weight % of MgO and various amounts (0.00–12.00 weight %) of TiO$_2$.
Figure 6:
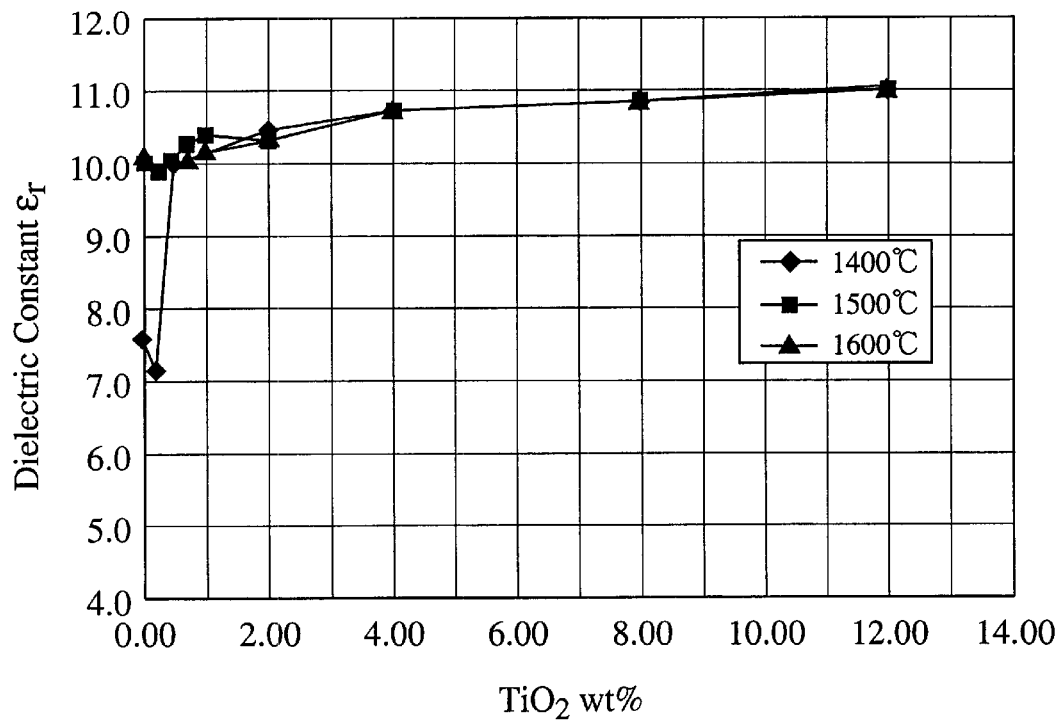
FIG. 6 is a graph showing the relation between the content of TiO$_2$ and a dielectric constant in alumina ceramic compositions containing 0.05 weight % of MgO and various amounts (0.00–12.00 weight %) of TiO$_2$.
Figure 7:
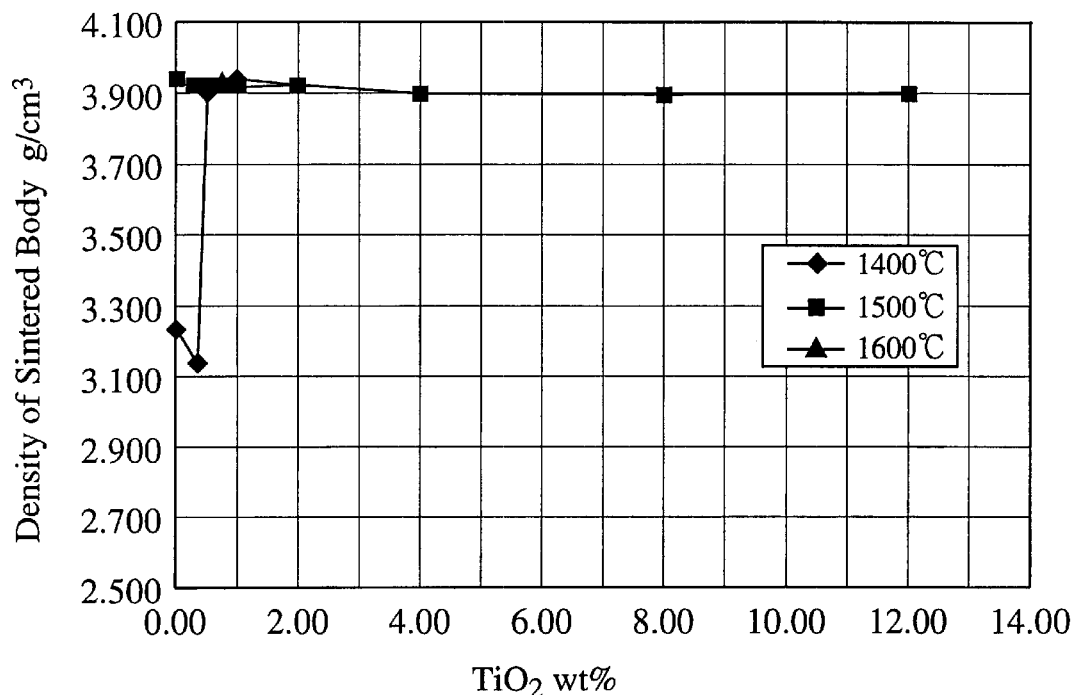
FIG. 7 is a graph showing the relation between the content of TiO$_2$ and a sintering density in alumina ceramic compositions containing 0.05 weight % of MgO and various amounts (0.00–12.00 weight %) of TiO$_2$.

Also, with respect to samples containing 0.05 weight % of MgO, the relation between the content of $TiO_2$ and a Q factor is shown in FIG. 5, the relation between the content of $TiO_2$ and a dielectric constant is shown in FIG. 6, and the relation between the content of $TiO_2$ and density of a sintered body is shown in FIG. 7. In each test, sintering was conducted at 1400° C., 1500° C. and 1600° C., respectively.

Figure 8:
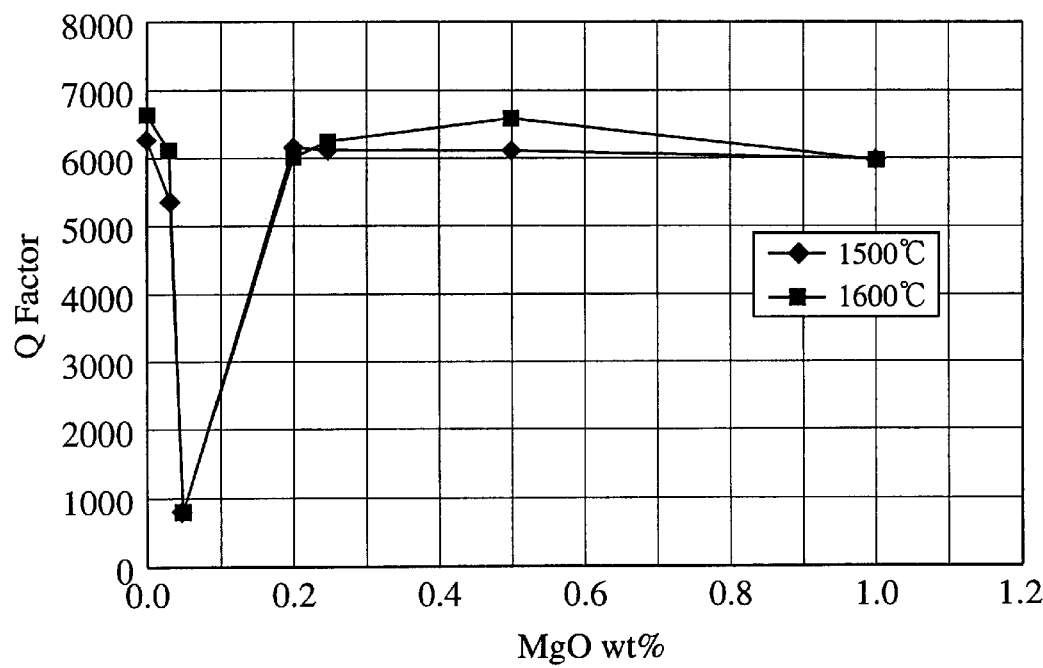
FIG. 8 is a graph showing the relation between the content of MgO and a Q factor in alumina ceramic compositions containing various amounts (0–weight %) of MgO and 1.0 weight % of TiO$_2$.

FIG. 8 shows the influence of the MgO content on the Q factor in alumina ceramic compositions containing various amounts (0–1 weight %) of MgO and 1.0 weight % of $TiO_2$. It was observed that the Q factor of the alumina ceramic composition was drastically reduced when the content of MgO was from 0.01 weight % to 0.2 weight %, and that it was extremely low at the MgO content of 0.05 weight %.

TABLE 1

| Sample No. | Example No. | MgO (weight %) | $TiO_2$ (weight %) | Sintering Temperature (° C.) |
|---|---|---|---|---|
| 1 | COMP. EX. 1 | 0.05 | 0.00 | 1400 |
| 2 | COMP. EX. 2 | 0.05 | 0.00 | 1500 |
| 3 | COMP. EX. 2 | 0.05 | 0.00 | 1600 |
| 4 | EXAMPLE 1 | 0.05 | 0.25 | 1400 |
| 5 | EXAMPLE 2 | 0.05 | 0.25 | 1500 |
| 6 | EXAMPLE 3 | 0.05 | 0.25 | 1600 |
| 7 | EXAMPLE 4 | 0.05 | 0.50 | 1400 |
| 8 | EXAMPLE 5 | 0.05 | 0.50 | 1500 |
| 9 | EXAMPLE 6 | 0.05 | 0.50 | 1600 |
| 10 | EXAMPLE 7 | 0.05 | 0.75 | 1500 |
| 11 | EXAMPLE 8 | 0.05 | 1.00 | 1400 |
| 12 | EXAMPLE 9 | 0.05 | 1.00 | 1500 |
| 13 | EXAMPLE 10 | 0.05 | 1.00 | 1600 |
| 14 | EXAMPLE 11 | 0.05 | 2.00 | 1500 |
| 15 | EXAMPLE 12 | 0.05 | 4.00 | 1500 |
| 16 | COMP. EX. 4 | 0.05 | 10.5 | 1500 |
| 17 | COMP. EX. 5 | 0.00 | 0.00 | 1500 |
| 18 | COMP. EX. 6 | 0.00 | 0.50 | 1500 |
| 19 | COMP. EX. 7 | 0.20 | 0.00 | 1500 |
| 20 | EXAMPLE 13 | 0.20 | 0.50 | 1500 |
| 21 | EXAMPLE 14 | 0.20 | 4.00 | 1500 |
| 22 | COMP. EX. 8 | 1.00 | 0.00 | 1500 |
| 23 | EXAMPLE 15 | 1.00 | 0.50 | 1500 |
| 24 | EXAMPLE 16 | 1.00 | 4.00 | 1500 |
| 25 | COMP. EX. 9 | 3.00 | 0.00 | 1500 |
| 26 | EXAMPLE 17 | 3.00 | 0.50 | 1500 |
| 27 | EXAMPLE 18 | 3.00 | 4.00 | 1500 |
| 28 | COMP. EX. 10 | 10.2 | 0.50 | 1500 |
| 29 | COMP. EX. 11 | 8.00 | 0.00 | 1450 |
| 30 | EXAMPLE 19 | 8.00 | 2.00 | 1450 |
| 31 | EXAMPLE 20 | 8.00 | 4.00 | 1450 |

TABLE 1-continued

| | | | | |
|---|---|---|---|---|
| 32 | EXAMPLE 21 | 8.00 | 8.00 | 1450 |
| 33 | EXAMPLE 22 | 2.00 | 8.00 | 1500 |
| 34 | EXAMPLE 23 | 4.00 | 8.00 | 1500 |
| 35 | COMP. EX. 12 | 10.5 | 10.5 | 1450 |

| Sample No. | Example No. | Q Factor | Dielectric Constant $\epsilon_r$ | Density of Sintered Body (g/cm$^3$) |
|---|---|---|---|---|
| 1 | COMP. EX. 1 | 271 | 7.6 | 3.24 |
| 2 | COMP. EX. 2 | 316 | 10.0 | 3.94 |
| 3 | COMP. EX. 2 | 842 | 10.1 | 3.97 |
| 4 | EXAMPLE 1 | 876 | 9.2 | 3.70 |
| 5 | EXAMPLE 2 | 1448 | 9.9 | 3.93 |
| 6 | EXAMPLE 3 | 2630 | 9.9 | 3.93 |
| 7 | EXAMPLE 4 | 2478 | 9.9 | 3.93 |
| 8 | EXAMPLE 5 | 2426 | 10.0 | 3.93 |
| 9 | EXAMPLE 6 | 2463 | 10.0 | 3.92 |
| 10 | EXAMPLE 7 | 3037 | 10.2 | 3.93 |
| 11 | EXAMPLE 8 | 2921 | 10.2 | 3.95 |
| 12 | EXAMPLE 9 | 2981 | 10.3 | 3.93 |
| 13 | EXAMPLE 10 | 2798 | 10.1 | 3.92 |
| 14 | EXAMPLE 11 | 2975 | 10.3 | 3.93 |
| 15 | EXAMPLE 12 | 2940 | 10.7 | 3.91 |
| 16 | COMP. EX. 4 | 654 | 10.2 | 3.88 |
| 17 | COMP. EX. 5 | 221 | 7.5 | 3.21 |
| 18 | COMP. EX. 6 | 627 | 9.1 | 3.68 |
| 19 | COMP. EX. 7 | 625 | 9.9 | 3.92 |
| 20 | EXAMPLE 13 | 2921 | 10.2 | 3.93 |
| 21 | EXAMPLE 14 | 2963 | 10.1 | 3.89 |
| 22 | COMP. EX. 8 | 721 | 10.0 | 3.91 |
| 23 | EXAMPLE 15 | 2952 | 10.1 | 3.93 |
| 24 | EXAMPLE 16 | 3021 | 10.1 | 3.90 |
| 25 | COMP. EX. 9 | 751 | 10.0 | 3.91 |
| 26 | EXAMPLE 17 | 2989 | 10.2 | 3.93 |
| 27 | EXAMPLE 18 | 2939 | 10.1 | 3.93 |
| 28 | COMP. EX. 10 | 563 | 10.2 | 3.89 |
| 29 | COMP. EX. 11 | 502 | 7.9 | 3.34 |
| 30 | EXAMPLE 19 | 3771 | 9.7 | 3.81 |
| 31 | EXAMPLE 20 | 3162 | 10.0 | 3.81 |
| 32 | EXAMPLE 21 | 2557 | 10.4 | 3.79 |
| 33 | EXAMPLE 22 | 3332 | 10.8 | 3.81 |
| 34 | EXAMPLE 23 | 2957 | 10.7 | 3.84 |
| 35 | COMP. EX. 12 | 780 | 11.5 | 3.75 |

It is clear from Table 1 and FIG. 5 that the Q factor of 850 or more can be obtained in these alumina ceramic compositions when Mg is 10 weight % or less (calculated as MgO), and Ti is 0.2–10 weight % (calculated as TiO$_2$). While the Q factor of alumina is extremely low at the MgO content of 0.05 weight %, the data of sample Nos. 1–16 show that as the content of TiO$_2$ increases, the Q factor increases, and that the Q factor is maximum at the TiO$_2$ content of 0.75 weight %. Also, as the sintering temperature is elevated, the Q factor increases together with a dielectric constant and a sintered body density. A practically acceptable Q factor is obtained at a sintering temperature of 1500° C. or lower. Though the effects of TiO$_2$ continue exhibiting as its content increases, the Q factor tends to decrease when the TiO$_2$ content exceeds 10 weight %. Excellent effects can be obtained by adding both Mg and Ti, while their proportions affect the Q factor. In general, the Q factor when obtained by adding both Mg and Ti is about 4–10 times that when there is no Ti. It is also confirmed that a dielectric constant $\epsilon_r$ was essentially constant when both Mg and Ti were added.

On the other hand, in Sample Nos. 19, 22, 25 and 29 containing no TiO$_2$ despite of inclusion of MgO, and in Sample Nos. 16 and 35 containing more than 10 weight % of MgO, the Q factor was as small as less than 850, failing to obtain a sufficient Q factor at a sintering temperature of 1500° C. Also, in Sample Nos. 1–3 containing only MgO, a sufficient Q factor was not obtained.

Figure 2:
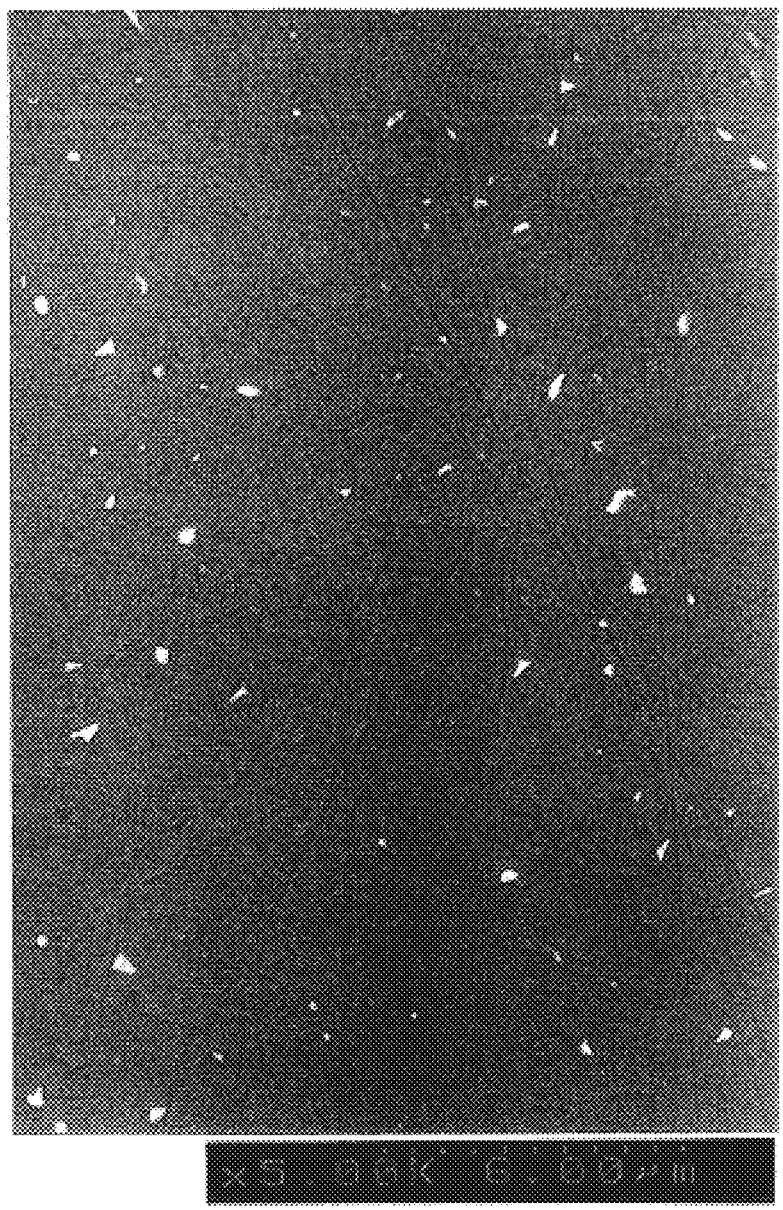
FIG. 2 is a photomicrograph showing the structure of an alumina ceramic composition of Sample No. 2 (COMPARATIVE EXAMPLE 2)
Figure 3:
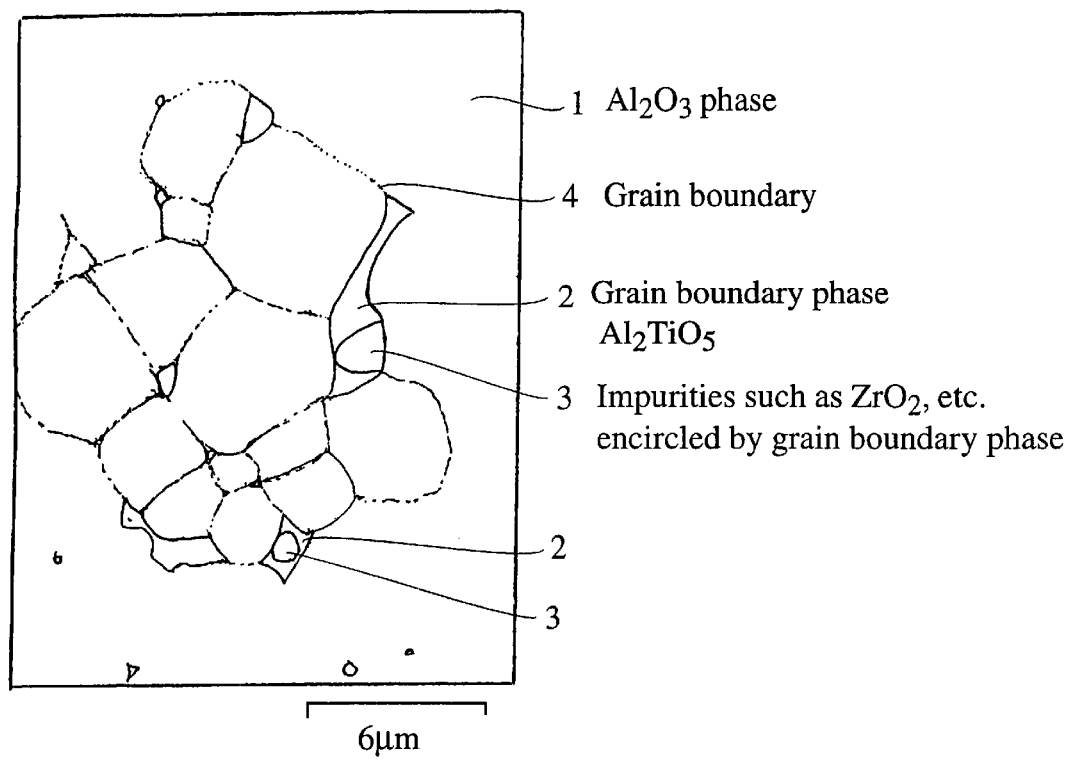
FIG. 3 is a schematic view of the photomicrograph shown in FIG. 1.
Figure 4:
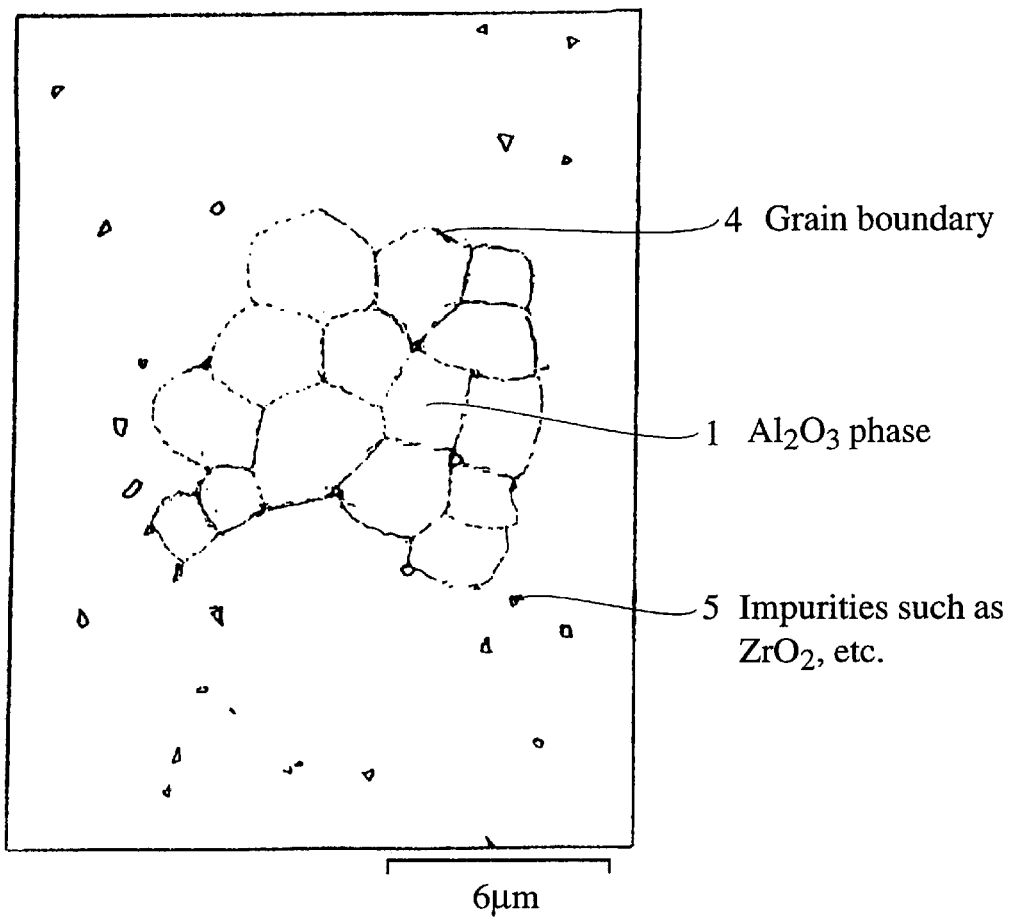
FIG. 4 is a schematic view of the photomicrograph shown in FIG. 2.

With respect to samples of EXAMPLES 2, 5, 7, 9, 11 and 12 and COMPARATIVE EXAMPLES 2 and 4, crystal phases in each sintered body were identified by an X-ray diffraction apparatus using a CuKα ray, and lattice constants of an Al$_2$O$_3$ phase were measured. The results are shown in Table 2. FIG. 1 is a photomicrograph of Sample No. 10 (EXAMPLE 7) containing 0.75 weight % of TiO$_2$, and FIG. 2 is a photomicrograph of Sample No. 2 (COMPARATIVE EXAMPLE 2) containing no TiO$_2$. Both photomicrographs were taken by a scanning-type electron microscope (SEM) at 5000 times on a representative ground surface of each sample. From X-ray diffraction results, a black background was identified as an Al$_2$O$_3$ phase, white regions were identified as ZrO$_2$, and gray regions were identified as an Al$_2$TiO$_5$ phase in FIGS. 1 and 2. FIGS. 3 and 4 are schematic views of FIGS. 1 and 2, respectively to clearly identify these phases. It should be noted that grain boundaries around alumina crystal grains are marked by dotted lines.

TABLE 2

| Example No. | Composition (wt %) | | | | Structure | | |
|---|---|---|---|---|---|---|---|
| | MgO | TiO$_2$ | Al$_2$O$_3$ | | ZrO$_2$ | | Al$_2$TiO$_5$ |
| COMP. EX. 2 | 0.05 | 0.00 | ++++ | | Tr. | | — | — |
| EXAMPLE 2 | 0.05 | 0.25 | ++++ | | Tr. | | Tr. | — |
| EXAMPLE 5 | 0.05 | 0.50 | ++++ | | Tr. | | Tr. | Tr. |
| EXAMPLE 7 | 0.05 | 0.75 | ++++ | | Tr. | | — | Tr. |
| EXAMPLE 9 | 0.05 | 1.00 | ++++ | | Tr. | | — | Tr. |
| EXAMPLE 11 | 0.05 | 2.00 | ++++ | | Tr. | | — | Tr. |
| EXAMPLE 12 | 0.05 | 4.00 | ++++ | | Tr. | | — | Tr. |
| COMP. EX. 4 | 0.05 | 10.5 | ++++ | | Tr. | | — | Tr. |

Note
++++: Extremely many.
Tr.: Trace amount.
—: Not detected.

| | Diffraction Intensity | | |
|---|---|---|---|
| Example No. | I (Al) Al$_2$O$_3$ | I (AT) Al$_2$TiO$_5$ | I (AT)/I (Al) × 100 (%) |
| COMP. EX. 2 | 12556 | — | 0 |
| EXAMPLE 2 | 14375 | — | 0 |
| EXAMPLE 5 | 13780 | 28 | 0.20 |
| EXAMPLE 7 | 11737 | 36 | 0.31 |
| EXAMPLE 9 | 12296 | 79 | 0.64 |
| EXAMPLE 11 | 12252 | 340 | 2.78 |
| EXAMPLE 12 | 11096 | 714 | 6.43 |
| COMP. EX. 4 | 10157 | 1625 | 16.0 |

Note
I (AT): Diffraction intensity in a (110) plane in an Al$_2$TiO$_5$ phase.
I (Al): Diffraction intensity in a (113) plane in an Al$_2$O$_3$ phase.

Al$_2$TiO$_5$ phases were clearly observed in the grain boundaries in X-ray diffraction measurement, when 0.75 weight % or more of TiO$_2$ were contained. Though it was determined that Al$_2$TiO$_5$ phases were formed even when TiO$_2$ was less than 0.75 weight %, clear observation of Al$_2$TiO$_5$ phases were impossible due to the precision of a measurement apparatus when TiO$_2$ was less than 0.5 weight %. In a sample (COMPARATIVE EXAMPLE 2) containing no TiO$_2$ as shown in FIG. 4, an impurity phase such as a ZrO$_2$ phase 5 was precipitated in such a dispersed manner that it inhibited the growth of an Al$_2$O$_3$ main phase.

On the other hand, in a sample (EXAMPLE 7) containing 0.75 weight % of TiO$_2$ as shown in FIG. 3, Al$_2$TiO$_5$ phases appeared in the structure of the alumina ceramic composition, precipitating at triple points of grain boundaries 4 (indicated by dotted lines) of an Al$_2$O$_3$ phase (main phase) 1 such that it surrounded impurity phases 3. Thus, Al$_2$TiO$_5$ phases 2 were formed around impurity phases 3 composed of ZrO$_2$, etc., thereby preventing the impurity phases 3 from dissolving into the Al$_2$O$_3$ main phase. As a result, the dielectric loss is suppressed, while increasing the Q factor. Observation on a fracture surface of a sample (EXAMPLE 7) in FIG. 3 revealed that an $Al_2O_3$ phase had an average particle size of about 4 μm, about three times as large as that of a sample (COMPARATIVE EXAMPLE 2) containing no $TiO_2$ in FIG. 4. This confirmed that the growth of main crystal grains was accelerated in the alumina ceramic composition of the present invention, thereby making it possible to provide a sintered body with a high density even at a low sintering temperature, verifying the effect of $Al_2TiO_5$ on improvement in sinterability.

It was also confirmed from Tables 1 and 2 that the Q factor of 850 or more was obtained in the range of x=0.2–15%.

Next, with respect to samples of EXAMPLES 2, 5, 7, 9, 11 and 12 and COMPARATIVE EXAMPLE 2, measurement results of lattice constants of the $Al_2O_3$ phase in each alumina ceramic composition are shown in Table 3.

TABLE 3

| Example No. | MgO (weight %) | $TiO_2$ (weight %) | Lattice Constant of $Al_2O_3$ (Å) a-axis | c-axis |
|---|---|---|---|---|
| COMP. EX. 2 | 0.05 | 0.00 | 4.7555 | 12.9869 |
| EXAMPLE 2 | 0.05 | 0.25 | 4.7567 | 12.9880 |
| EXAMPLE 5 | 0.05 | 0.50 | 4.7561 | 12.9846 |
| EXAMPLE 7 | 0.05 | 0.75 | 4.7558 | 12.9850 |
| EXAMPLE 9 | 0.05 | 1.00 | 4.7562 | 12.9857 |
| EXAMPLE 11 | 0.05 | 2.00 | 4.7565 | 12.9884 |
| EXAMPLE 12 | 0.05 | 4.00 | 4.7584 | 12.9847 |
| Standard Value* | | | 4.7587 | 12.9829 |

Note
*Standard values of lattice constants of high-purity alumina (purity: 99.999%) along an a-axis and a c-axis, respectively.

The above measurement results of lattice constants revealed that the lattice constants of the $Al_2O_3$ phase in a sample (COMPARATIVE EXAMPLE 2) containing no $TiO_2$ were much smaller than the standard values both in an a-axis and a c axis, suggesting that there was large lattice strain. It is considered that this lattice strain is caused by impurities such as MgO, etc. dissolved into the $Al_2O_3$ phase. The inclusion of $TiO_2$ makes the lattice constant of an alumina ceramic composition closer to the standard lattice strain value of alumina, thereby removing the lattice strain and thus increasing the Q factor. Defining a proper range of the lattice strain with respect to the a-axis, $-0.003 \leq \Delta L_a < 0$ (unit: angstrom). It is clear from Tables 1 and 3 that when $\Delta L_a$ is less than −0.003, the Q factor of 850 or more cannot be obtained.

As described above in detail, the alumina ceramic composition containing proper amounts of MgO and $TiO_2$ according to the present invention has a Q factor of 850 or more, even though it is formed from low-purity alumina. The alumina ceramic composition of the present invention has excellent sinterability and productivity. In the alumina ceramic composition having a ratio X $[I(AT)/I (Al) \times 100\%]$ of 0.2–15%, wherein I (Al) represents a diffraction intensity in a (113) plane in an $Al_2O_3$ phase, and I (AT) represents a diffraction intensity in a (110) plane in an $Al_2TiO_5$ phase, the $Al_2TiO_5$ phase is properly precipitated in the grain boundaries to prevent impurities from dissolving into an $Al_2O_3$ main phase, thereby suppressing increase in a dielectric loss and improving a Q factor. Also, in the alumina ceramic composition meeting $-0.003 \leq \Delta L_a 0$ (unit: angstrom), a lattice strain is suppressed, thereby suppressing increase in a dielectric loss and improving a Q factor.

What is claimed is:

1. An alumina ceramic composition comprising 10 weight % or less (calculated as MgO) of Mg, and 0.2–10 weight % (calculated as $TiO_2$) of Ti, the balance being substantially an $Al_2O_3$ phase and inevitable impurities, wherein said alumina ceramic composition has a structure having an $Al_2TiO_5$ phase precipitated in grain boundaries.

2. The alumina ceramic composition according to claim 1, wherein the content of Mg is 0.2 weight % or less when calculated as MgO.

3. The alumina ceramic composition according to claim 1, wherein the content of Ti is 0.5–10 weight % when calculated as $TiO_2$.

4. The alumina ceramic composition according to claim 2, wherein the content of Ti is 0.5–10 weight % when calculated as $TiO_2$.

5. The alumina ceramic composition according to claim 1, wherein said $Al_2TiO_5$ phase precipitated in grain boundaries surrounds inevitable impurities in said grain boundaries.

6. The alumina ceramic composition according to claim 1, wherein said alumina ceramic composition exhibits a Q factor of 850 or more when measured at a frequency of 10 GHz.

7. An alumina ceramic composition having a structure having an $Al_2O_3$ main phase and grain boundaries containing an $Al_2TiO_5$ phase, a ratio X of $[I(AT)/I (Al) \times 100\%]$ being 0.2–15%, wherein I (Al) represents a diffraction intensity in a (113) plane in said $Al_2O_3$ phase, and I (AT) represents a diffraction intensity in a (110) plane in said $Al_2TiO_5$ phase, both determined from an X-ray diffraction pattern.

8. The alumina ceramic composition according to claim 7, wherein said $Al_2TiO_5$ phase precipitated in grain boundaries surrounds inevitable impurities in said grain boundaries.

9. The alumina ceramic composition according to claim 7, wherein said alumina ceramic composition exhibits a Q factor of 850 or more when measured at a frequency of 10 GHz.

10. An alumina ceramic composition based on $Al_2O_3$ and containing Mg, Ti and inevitable impurities, wherein the value $\Delta L_a$ obtained by subtracting the standard value $L_s$ of 4.7587 of an a-axis lattice constant of $Al_2O_3$ in a standard powder X-ray diffraction pattern from an a-axis lattice constant $L_a$ of the $Al_2O_3$ phase is in the range of $-0.003 \leq \Delta L_a < 0$ (unit: angstrom).

11. The alumina ceramic composition according to claim 10, wherein said alumina ceramic composition exhibits a Q factor of 850 or more when measured at a frequency of 10 GHz.

12. An alumina ceramic composition comprising 10 weight % or less (calculated as MgO) of Mg, and 0.2–10 weight % (calculated as $TiO_2$) of Ti, the balance being substantially an $Al_2O_3$ phase and inevitable impurities, said alumina ceramic composition being produced by steps comprising (a) forming a slurry comprising said $Al_2O_3$, Mg, Ti and water, (b) spray-drying the slurry, (c) crushing and granulating the dried material, (d) molding the resulting granulated powder, and (e) sintering the molding at 1400–1600° C. for 0.5–4 hours in the air.

13. The alumina ceramic composition according to claim 12, wherein the content of Mg is 0.2 weight % or less when calculated as MgO.

14. The alumina ceramic composition according to claim 13, wherein the content of Ti is 0.5–10 weight % when calculated as $TiO_2$.

15. The alumina ceramic composition according to claim 12, wherein the content of Ti is 0.5–10 weight % when calculated as $TiO_2$.

* * * * *